US009062709B2

(12) United States Patent
Lemaitre et al.

(10) Patent No.: US 9,062,709 B2
(45) Date of Patent: *Jun. 23, 2015

(54) POSITIONING MEANS FOR CAMSHAFT ROLLER BEARING

(71) Applicant: Koyo Bearings North America LLC, Westlake, OH (US)

(72) Inventors: Fabrice Lemaitre, Ribeauville (FR); Matthieu Lavieuville, Ammerschwihr (FR); Christophe Artur, Colmar (FR); Jens-Eike Jesau, Wunnenberg (DE)

(73) Assignee: Koyo Bearings North America LLC, Westlake, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/028,752

(22) Filed: Sep. 17, 2013

(65) Prior Publication Data

US 2014/0016891 A1 Jan. 16, 2014

Related U.S. Application Data

(63) Continuation of application No. 12/596,854, filed as application No. PCT/US2008/078227 on Sep. 30, 2008, now Pat. No. 8,568,038.

(60) Provisional application No. 60/977,111, filed on Oct. 3, 2007.

(51) Int. Cl.
*F16C 33/56* (2006.01)
*F16C 33/46* (2006.01)
(Continued)

(52) U.S. Cl.
CPC .............. *F16C 19/24* (2013.01); *F01L 1/047* (2013.01); *F01L 1/053* (2013.01);
(Continued)

(58) Field of Classification Search
CPC ...... F01L 1/047; F01L 2001/0476; F16C 19/466; F16C 33/4605; F16C 2360/18; F16C 19/24; F16C 35/067; F16C 43/065; F16C 33/586
USPC ........ 384/525, 548, 560, 569, 572, 575–576, 384/582, 584–585, 618, 620–621; 29/898.064, 898.065, 898.067
See application file for complete search history.

(56) References Cited

U.S. PATENT DOCUMENTS 1,668,112 A 5/1928 Gibbons
2,435,839 A * 2/1948 McNicoll ...................... 384/575
(Continued)

FOREIGN PATENT DOCUMENTS

DE 1957573 3/1967
DE 1249020 8/1967
(Continued)

OTHER PUBLICATIONS

Office Action issued by the Chinese Patent Office, dated Mar. 6, 2012, for Chinese Application No. 200880110305.0.
(Continued)

*Primary Examiner* — Marcus Charles
(74) *Attorney, Agent, or Firm* — Nelson Mullins Riley & Scarborough, LLP (57) ABSTRACT

A roller bearing assembly includes a plurality of rollers (122), a cage (114) including a plurality of slots (118) for positioning the plurality of rollers, an outer race (134) positioned radially outside the plurality of rollers and the cage, and means (126, 130, 138) for retaining axial alignment between the cage and the outer race provided integrally with at least one of the cage and the outer race.

10 Claims, 6 Drawing Sheets

(51) Int. Cl.
  *F16C 43/06* (2006.01)
  *F16C 19/24* (2006.01)
  *F01L 1/047* (2006.01)
  *F01L 1/053* (2006.01)
  *F16C 19/46* (2006.01)
  *F16C 35/067* (2006.01)
  *F16C 43/04* (2006.01)
  *F16C 33/58* (2006.01)

(52) U.S. Cl.
  CPC ...... *F01L 2001/0476* (2013.01); *F16C 19/466* (2013.01); *F16C 33/4605* (2013.01); *F16C 2360/18* (2013.01); *F16C 35/067* (2013.01); *F16C 43/04* (2013.01); *F16C 33/586* (2013.01)

(56) References Cited

U.S. PATENT DOCUMENTS

| | | | |
|---|---|---|---|
| 2,969,267 A | | 1/1961 | Gothberg |
| 3,482,891 A | | 12/1969 | Evangelista et al. |
| 3,847,456 A | * | 11/1974 | Schwarzbich ............... 384/620 |
| 3,975,066 A | | 8/1976 | Hofmann et al. |
| 4,136,916 A | * | 1/1979 | Musselman et al. .......... 384/560 |
| 4,541,744 A | | 9/1985 | Lederman |
| 4,708,693 A | * | 11/1987 | Orain ........................... 464/111 |
| 4,712,661 A | | 12/1987 | Lederman et al. |
| 4,787,490 A | | 11/1988 | Lederman et al. |
| 4,822,183 A | * | 4/1989 | Lederman ..................... 384/607 |
| 4,978,237 A | | 12/1990 | Motohashi et al. |
| 5,810,484 A | * | 9/1998 | Bustamante et al. ......... 384/609 |
| 5,885,009 A | | 3/1999 | Muntnich et al. |
| 5,897,215 A | | 4/1999 | Mirring |
| 6,666,585 B1 | | 12/2003 | Kotzalas et al. |
| 8,313,246 B2 | * | 11/2012 | Oishi et al. ................... 384/572 |
| 2007/0223854 A1 | | 9/2007 | Waseda et al. |
| 2007/0269156 A1 | | 11/2007 | Sakaki |
| 2008/0193070 A1 | * | 8/2008 | Beluffi et al. ................ 384/523 |

FOREIGN PATENT DOCUMENTS

| | | |
|---|---|---|
| DE | 2441121 | 3/1976 |
| DE | 3914056 | 8/1990 |
| DE | 19745410 | 4/1999 |
| DE | 102007013039 | 9/2008 |
| EP | 1837537 | 9/2007 |
| JP | 2005172059 | 6/2005 |
| JP | 2006132623 | 5/2006 |
| JP | 2006322581 | 11/2006 |
| WO | 0019117 | 4/2000 |
| WO | 2008050671 | 5/2008 |
| WO | 2008113437 | 9/2008 |

OTHER PUBLICATIONS

Office Action from the European Patent Office, dated Aug. 17, 2010, for European Patent Application No. 08 835 005.3-2424.
Search Report and Written Opinion for PCT/US2008/078227, dated Dec. 4, 2008, 11 pages.
Office Action dated Jan. 24, 2013 for Japanese Patent Application No. 2010-528061.
Office Action dated Oct. 17, 2013 for Korean Patent Application No. 10-2010-7007247.
Final Notification of Reason for Rejection dated Feb. 4, 2014 for corresponding Japanese Patent Application No. 2010-528061.

* cited by examiner

POSITIONING MEANS FOR CAMSHAFT ROLLER BEARING

CROSS-REFERENCE TO RELATED APPLICATIONS

This application is a continuation of U.S. patent application Ser. No. 12/596,854 filed on Oct. 21, 2009, which is a 371 application of PCT/US2008/078227 filed on Sep. 30, 2008, which claims priority to U.S. Provisional Patent Application No. 60/977,111 filed on Oct. 3, 2007, the entire contents of which are hereby incorporated by reference.

FIELD OF THE INVENTION

The present invention relates to a roller bearing, which may be used to support the camshaft of an internal combustion engine for rotation about an axis. More particularly, the invention relates to means for maintaining positive axial positioning of the roller bearing, and components thereof.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
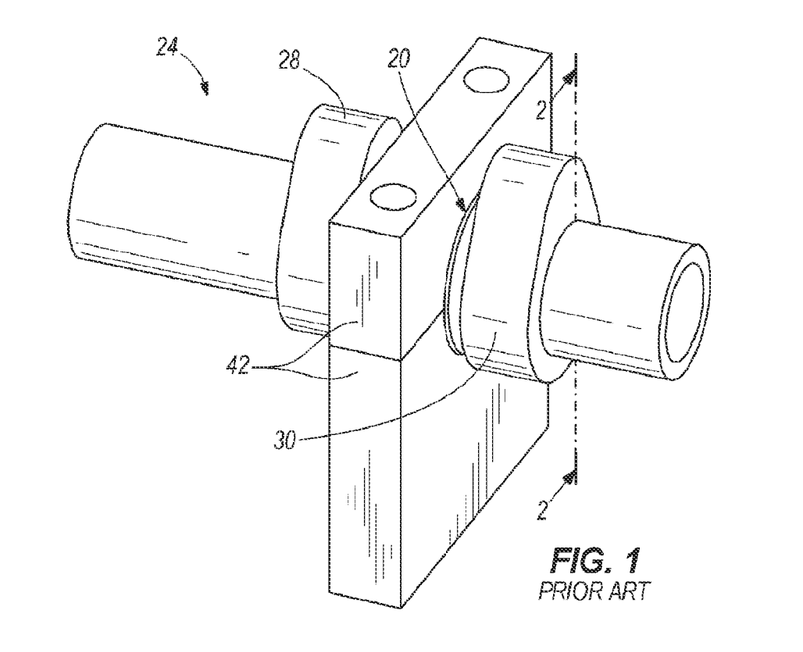
FIG. 1 is a perspective view of a prior art roller bearing assembly for a camshaft.
Figure 2:
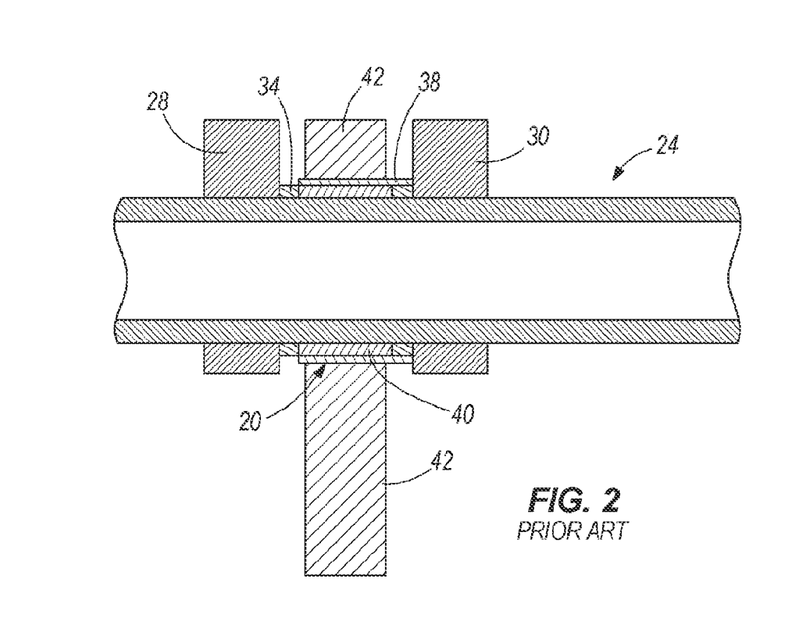
FIG. 2 is a cross-sectional view of the prior art roller bearing assembly, taken along line 2-2 of FIG. 1, illustrating the roller bearing in a misaligned position.

FIGS. 1 and 2 illustrate a prior art needle roller bearing assembly 20 supporting a camshaft 24 between two axially adjacent lobes 28,30 of the camshaft 24. The needle roller bearing assembly 20 includes a cage 34, an outer race 38, and a plurality of needle roller elements 40. Commonly, an inner race can also be provided so that the needle roller elements 40 do not directly touch the camshaft 24. In FIGS. 1 and 2, the needle roller bearing assembly 20 is held within a two piece clamp-type block 42. The block 42 maintains the needle roller bearing assembly 20 in a predetermined position, coaxial with the camshaft 24 such that the needle roller bearing assembly 20 provides a low friction restraining mechanism for the camshaft 24 to rotate in place (e.g., within the cylinder head of an internal combustion engine).

In the arrangement of FIGS. 1 and 2, the outer race 38 is clamped in the block 42 and does not rotate with the camshaft 24. The needle roller elements 40 contact the outer surface of the camshaft 24 (when a separate inner race is not provided, as illustrated) and experience rolling engagement therewith. The prior art outer race 38 is of a simple cylindrical form and as such, is free to move axially relative to the needle roller elements 40 and the cage 34. The clamping of the outer race 38 by the block 42 provides some resistance to axial movement of the outer race 38, but such movement is not inherently prevented, and the initial installation of the needle roller bearing assembly 20 in the block 42 is complicated by the lack of any intrinsic means for positively axially positioning the needle roller bearing assembly 20 relative to the block 42. FIG. 2 illustrates the case in which the cage 34 is substantially sandwiched between the adjacent cam lobes 28,30, but the outer race 38 is axially misaligned with the block 42 and with the rest of the needle roller bearing assembly 20.

Figure 3:
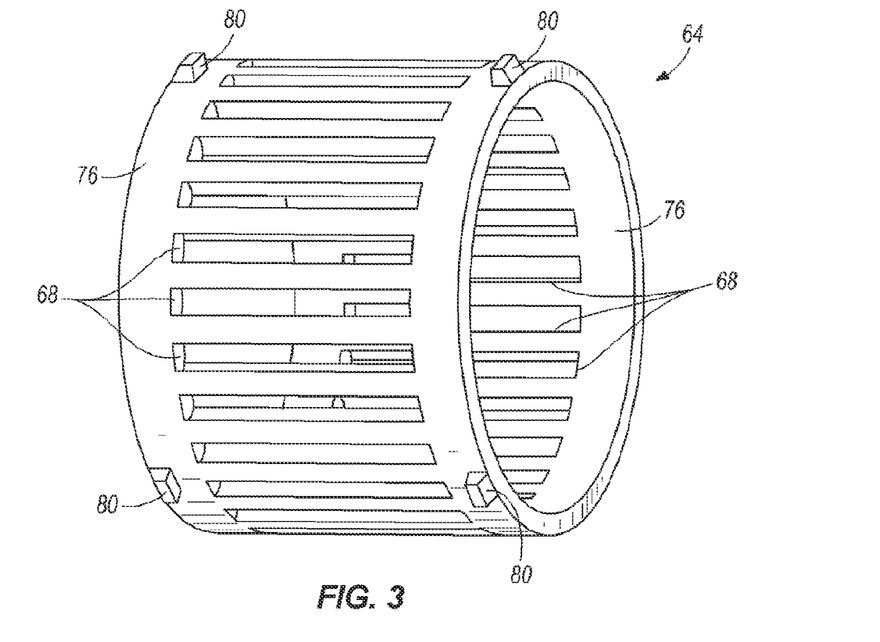
FIG. 3 is a perspective view of a needle roller bearing cage of one embodiment of the present invention.
Figure 4A:
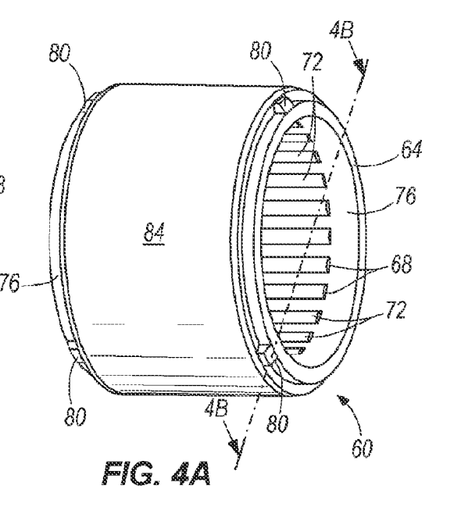
FIG. 4A is a perspective view of a needle roller bearing assembly including the needle roller bearing cage of FIG. 3 assembled with an outer race.
Figure 4B:
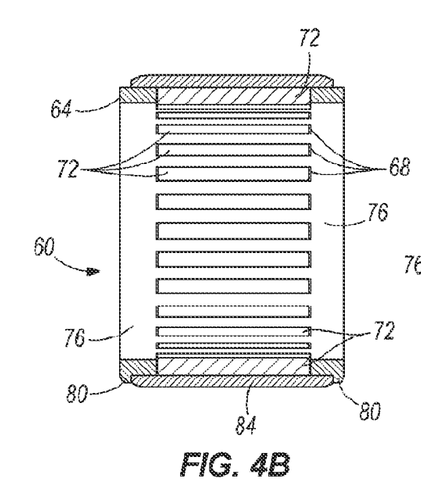
FIG. 4B is a cross-sectional view of the needle roller bearing assembly, taken along line 4-4 of FIG. 4A.

FIG. 3 illustrates a cage 64 of a roller bearing assembly, particularly a needle roller bearing assembly 60 (FIGS. 4A-5), according to one embodiment of the present invention. The cage 64 includes a plurality of slots 68 configured to receive individual rollers, such as needle roller elements 72. The cage 64 includes a rim portion 76 at each end, axially beyond the end of the slots 68. Each rim portion 76 includes at least one radial projection 80. In the illustrated embodiment, each rim portion 76 includes 3 circumferentially-spaced radial projections 80. The needle roller bearing assembly 60 also includes an outer race 84 positioned radially outward of the needle roller elements 72 and axially centered on the cage 64 between the radial projections 80 of the respective rim portions 76.

Figure 5:
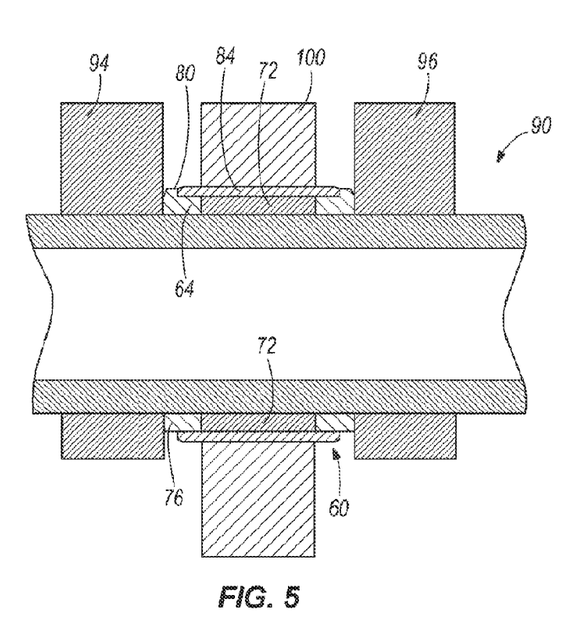
FIG. 5 is a cross-sectional view of the needle roller bearing assembly of FIGS. 4A and 4B assembled on a camshaft.

FIG. 5 illustrates the needle roller bearing assembly 60 assembled on a camshaft 90 between two adjacent cam lobes 94, 96 of the camshaft 90. The needle roller bearing assembly 60 is held within a two piece clamp-type block 100. The outer surface of the outer race 84 is held within the block 100 and remains stationary therewith. The needle roller elements 72 contact the cylindrical outer surface of the camshaft 90 directly, but an inner race can be provided between the needle roller elements 72 and the camshaft 90 in some embodiments. As shown in FIG. 5, the radial projections 80 on the rim portions 76 of the cage 64 prevent the outer race 84 from axial displacement. Thus, the outer race 84 cannot slide axially relative to the needle roller elements 72 and the cage 64. The mounting arrangement shown in FIG. 5 enables the bearing assembly 60 to be pre-assembled onto the camshaft 90 so that the outer race 84 is automatically located in the desired position for being received in the block 100, eliminating the need for an assembler or machine to position the outer race 84 relative to the block 100 during assembly.

Figure 6A:
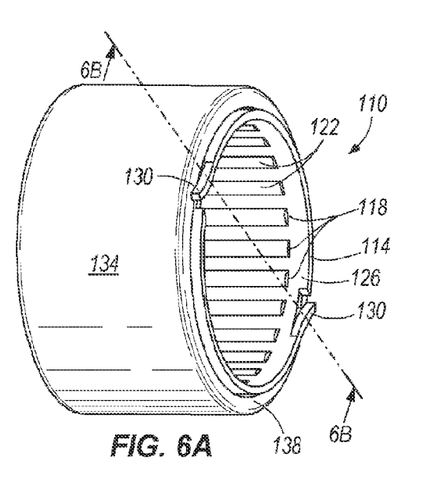
FIG. 6A is a perspective view of a needle roller bearing assembly of one embodiment of the present invention.
Figure 6B:
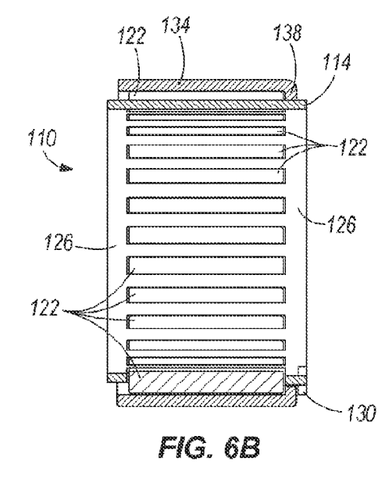
FIG. 6B is a cross-sectional view of the needle roller bearing assembly, taken along line 6-6 of FIG. 6A.

FIGS. 6A and 6B illustrate a roller bearing assembly, particularly a needle roller bearing assembly 110 including a cage 114 according to one embodiment of the present invention. The cage 114 includes a plurality of slots 118 configured to receive individual rollers such as needle roller elements 122. The cage 114 includes a rim portion 126 at each end, axially beyond the end of the slots 118. Each rim portion 126 includes at least one radial projection 130. In the illustrated embodiment, each rim portion 126 includes two circumferentially-spaced radial projections 130. In the illustrated embodiment of FIGS. 6A and 6B, the radial projections 130 are formed by split away sections of the rim portions 126 that curve or extend radially outward from the cylindrical wall of the cage 114. The needle roller bearing assembly 110 also includes an outer race 134 positioned radially outward of the needle roller elements 122 and axially centered on the cage 114 between the radial projections 130 of the respective rim portions 126.

One end of the outer race 134 includes a radially inward projection 138 extending around the entire circumference of the outer race 134. The radially inward projection 138 extends over at least a portion of each of the needle roller elements 122 as shown on the right side of the bearing assembly 110 in FIG. 6B. The radial projections 130 of the cage 114 extend radially outward into radial alignment with the inward projection 138 of the outer race 134. Thus, the outer race 134 is axially positioned by the inward projection 138, which is sandwiched between the needle roller elements 122 and the radial projections 130 of the cage 114. The inward projection 138 of the outer race 134 and the radial projections 130 of the cage 114 also provide a mechanism by which the axial alignment of the needle roller bearing assembly 110 is easily controlled during installation. Similar to the bearing assembly 60 of FIGS. 4A-5, the bearing assembly 110 of FIGS. 6A and 6B allows the assembly onto a camshaft so that the outer race 134 is automatically located in the correct axial position for being supported, eliminating the need for an assembler or machine to position the outer race 134 relative to the support structure (e.g., a clamp-type block) during assembly.

Figure 7:
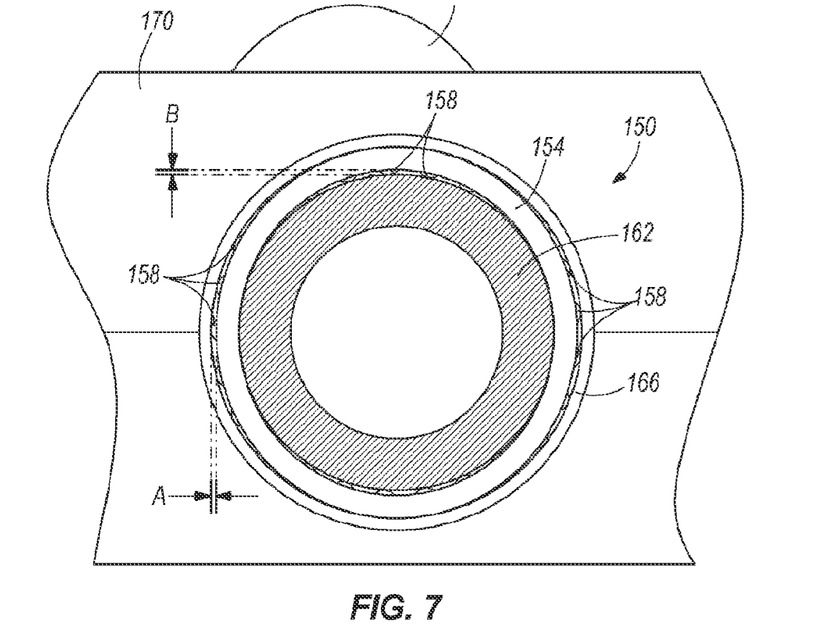
FIG. 7 is an end view of a needle roller bearing assembly of one embodiment of the present invention.

FIG. 7 is an end view illustrating a roller bearing assembly, particularly a needle roller bearing assembly 150 including a cage 154 according to one embodiment of the present invention. The cage 154 includes a plurality of slots (not shown) configured to receive individual rollers, such as needle roller elements 158 to provide rolling bearing support of a camshaft 162. The needle roller bearing assembly 150 also includes an outer race 166 radially outward of the needle roller elements 158. The outer race 166 contains the needle roller elements 158 and provides a surface on which the elements 158 can roll. A two piece clamp type block 170 holds the needle roller bearing assembly 150 by contacting an outer surface of the outer race 166. The block 170 may be axially positioned between two adjacent cam lobes 174 of the camshaft 162, one of which is shown in FIG. 7

The cage 154 of FIG. 7 is generally ovular or elliptical as opposed to circular. However, the outer race 166 and the camshaft 162 are substantially circular such that the cage 154 does not share a single common axis with the outer race 166 and the camshaft 162. At two circumferentially opposing sides of the cage 154, a radial gap A is created between an outer edge of the cage 154 and an inner edge of the outer race 166. These locations represent the smallest distance across the cage 154. At two different circumferentially opposing sides of the cage 154, a radial gap B is created between an inner edge of the cage 154 and an outer surface of the camshaft 162. These locations, which represent the largest distance across the cage 154, are spaced approximately 90 degrees apart from the locations defining the gaps A. Due to the noncircularity of the cage 154, resistance to axial misalignment is provided by an interference fit with at least one of the outer race 166 and the camshaft 162. When an interference fit is established between the cage 154 and the outer race 166, the bearing assembly 150 of FIG. 7 may be pre-assembled onto the camshaft 162 so that the outer race 166 is automatically located in the correct axial position for being supported, eliminating the need for an assembler or machine to position the outer race 166 relative to the block 170 during assembly.

Figure 8A:
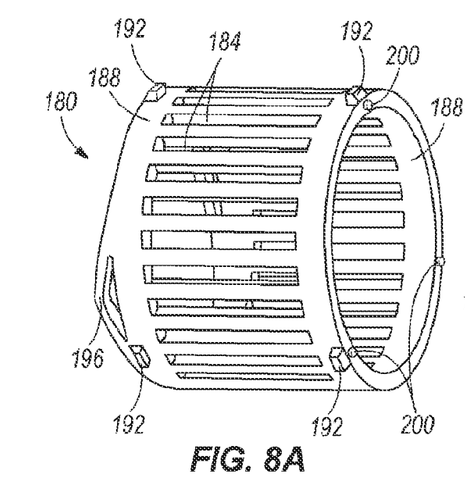
FIG. 8A is a perspective view of a needle roller bearing cage of one embodiment of the invention.
Figure 8B:
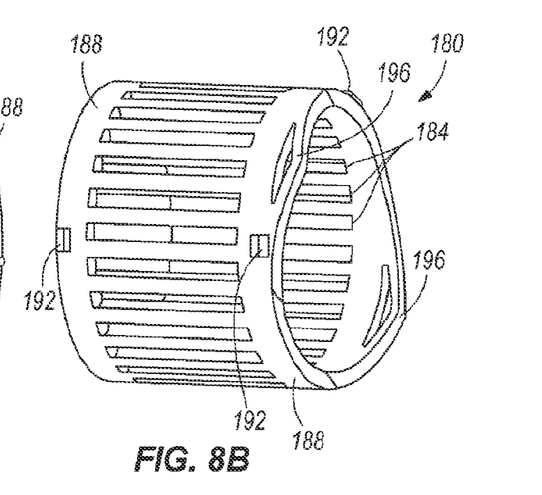
FIG. 8B is an alternate perspective view of the needle roller bearing cage of FIG. 8A.

FIGS. 8A and 8B illustrate a cage 180 for a roller bearing assembly, particularly a needle roller bearing assembly (not shown) according to one embodiment of the present invention. The cage 180 is substantially similar to the cage 64 illustrated in FIGS. 3-5. The cage 180 includes a plurality of slots 184 for retaining individual rollers, such as needle roller elements (not shown). The cage 180 also includes two rim portions 188, each one including one or more radial projections 192, (similar to the radial projections 80 described above with reference to the cage 64 of FIGS. 3-5) which enable precise, automatic positioning of an outer race relative to a support when pre-assembled onto a camshaft. In addition to the radial projections 192, the cage 180 includes spring portions 196 extending axially outward from one of the rim portions 188. The cage 180 includes two circumferentially spaced spring portions 196, but other arrangements are contemplated. The cage 180 further includes wear-off portions 200 in the form of studs or bumps on the axial surface of the rim portion 188 opposite the spring portions 196. The wear-off portions 200 are illustrated in FIG. 8A as including three circumferentially spaced rounded studs, but other structures and arrangements are contemplated. The wear-off portions 200 are constructed of a material that is configured to wear away by frictional engagement with adjacent structure, such as the side face of a cam lobe.

Although the cage 180 of FIGS. 8A and 8B includes spring portions 196 on one end and wear-off portions 200 on the opposite end, other configurations are foreseen that include spring portions 196 on both ends or alternately, wear-off portions 200 on both ends. The spring portions 196 enable the cage 180 to be press-fit in between a pair of cam lobes with a slight amount of axial interference. The wear-off portions 200 are configured to wear down as the camshaft rotates until the interference is nearly or completely eliminated and/or a minute axial clearance is created. This prevents undue resistance to rotation of the camshaft by the cage 180 bearing axially against the side faces of adjacent cam lobes. Thus, the effort to design and manufacture components with precise axial tolerance is reduced. The spring portions 196 may or may not be constructed of a material similar to the bumps 200 so that they are also configured to wear down by frictional contact in order to reduce axial interference and drag on the camshaft.

Figure 9A:
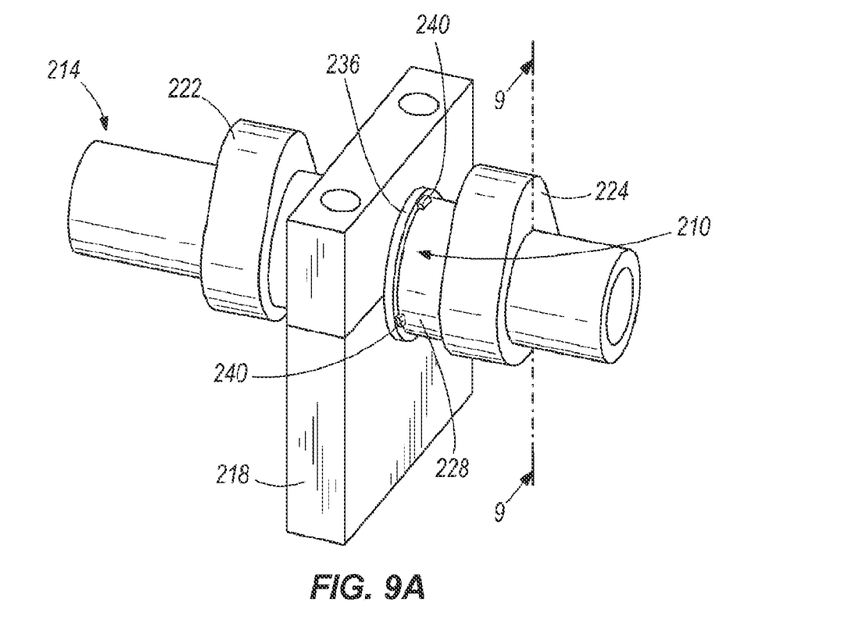
FIG. 9A is a perspective view of a needle roller bearing assembly of one embodiment of the invention assembled on a camshaft having a large axial spacing between cam lobes.
Figure 9B:
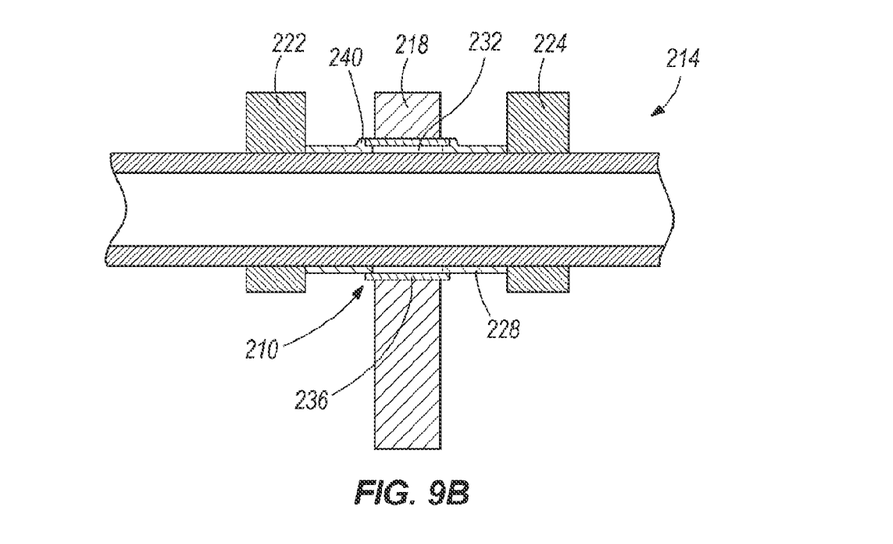
FIG. 9B is a cross-sectional view of the needle roller bearing assembly and camshaft, taken along line 9-9 of FIG. 9A.

FIGS. 9A and 9B illustrate a roller bearing assembly, particularly a needle roller bearing assembly 210 assembled on a camshaft 214 with a two piece clamp-type block 218. The needle roller bearing assembly 210 supports the camshaft 214 for rotation between two adjacent cam lobes 222, 224 of the camshaft 214. The needle roller bearing assembly 210 includes a cage 228, a plurality of rollers, such as needle roller elements 232, and an outer race 236. As discussed above with respect to a previous embodiment, an inner race can additionally be provided in some embodiments.

The cage 228 includes slots to position each of the needle roller elements 232. The cage 228, similar to the cage 64 of FIGS. 3-5, also includes radial projections 240 that position the cage 228 axially relative to the outer race 236. Thus, the bearing assembly 210 of FIGS. 9A and 9B may be pre-assembled onto the camshaft 214 so that the outer race 236 is automatically located in the correct axial position relative to the block 218, eliminating the need for an assembler or machine to position the outer race 236 relative to the block 218 during assembly. The cage 228 varies from the cage 64 of FIGS. 3-5 by having an extended axial length, so that the cage 228 substantially fills the space between the adjacent cam lobes 222, 224. Thus, the cage 228 is restrained from moving axially by the presence of the cam lobes 222, 224, and the outer race 236 is restrained from moving axially by the radial projections 240 of the cage 228. Thus, bearing misalignment does not develop during use, and assembly of the needle roller bearing assembly 210 is simplified by providing an intrinsic mechanism by which the cage 228 and the outer race 236 are axially positioned with respect to each other.

Figure 10A:
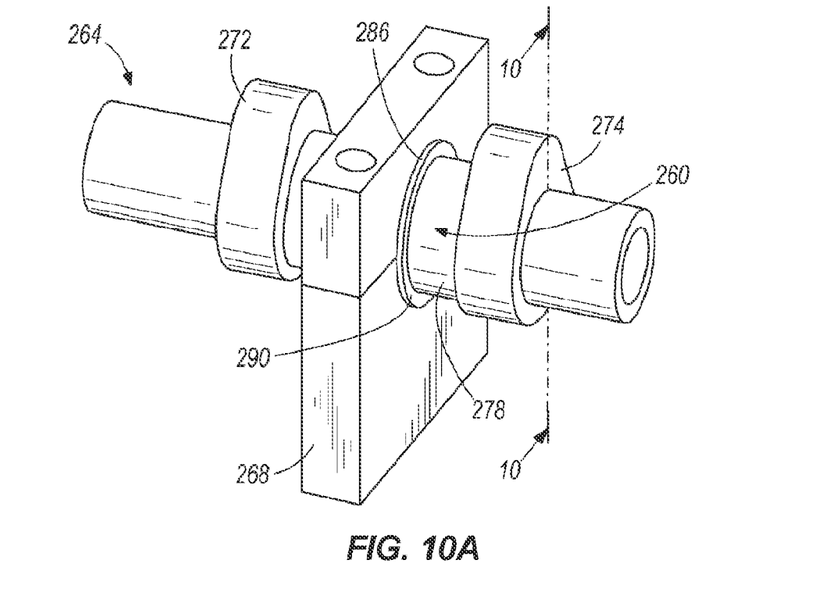
FIG. 10A is a perspective view of a needle roller bearing assembly of one embodiment of the invention assembled on a camshaft.
Figure 10B:
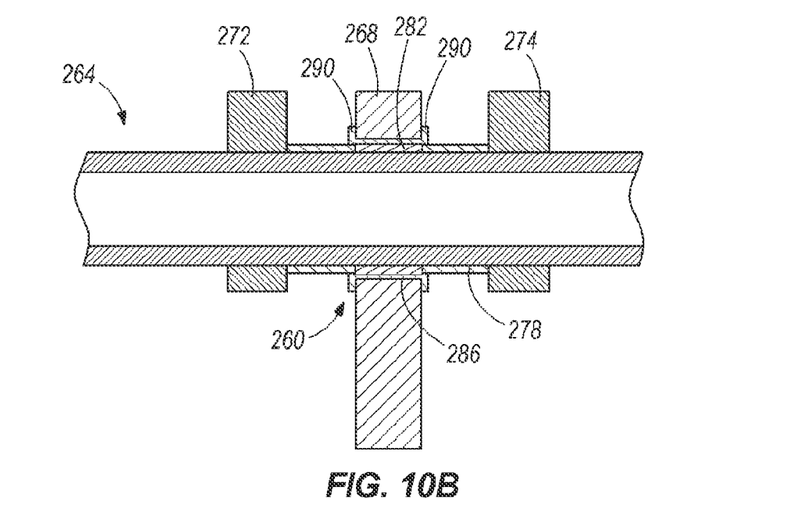
FIG. 10B is a cross-sectional view of the needle roller bearing assembly, taken along line 10-10 of FIG. 10A.

FIGS. 10A and 10B illustrate a roller bearing assembly, particularly a needle roller bearing assembly 260 assembled on a camshaft 264 with a two piece clamp-type block 268. The needle roller bearing assembly 260 supports the camshaft 264 for rotation between two adjacent cam lobes 272, 274 of the camshaft 264. The needle roller bearing assembly 260 includes a cage 278, a plurality of rollers, such as needle roller elements 282, and an outer race 286. As discussed above with respect to a previous embodiment, an inner race can additionally be provided in some embodiments.

The cage 278 includes slots to position each of the needle roller elements 282. The cage 278, similar to the cage 228 of FIGS. 9A and 9B, has an extended axial length, so that the cage 278 substantially fills the space between the adjacent cam lobes 272, 274. Thus, the cage 278 is restrained from moving axially by the presence of the cam lobes 272, 274. Rather than providing a direct mechanism between the cage 278 and the outer race 286 by which relative axial movement is prevented, the outer race 286 is positioned axially by a peripheral wall 290 at each end that extends radially from the axial end faces of the outer race 286 and engages the block 268. Thus, bearing misalignment does not develop during use, and assembly of the needle roller bearing assembly 260 is simplified by providing intrinsic features by which the cage 278 and the outer race 286 are axially positioned with respect to the axially stationary elements of the camshaft 264 and the block 268.

The embodiments described above and illustrated in the figures are presented by way of example only and are not intended as a limitation upon the concepts and principles of the present invention. For example, the invention is not limited to use with camshafts, or with internal combustion engines in general.

Various features of the invention are set forth in the following claims.

The invention claimed is:

1. A roller bearing assembly comprising:
a plurality of rollers;
a cage including a plurality of slots for positioning the plurality of rollers;
an outer race positioned radially outside the plurality of rollers and the cage, the outer race being cylindrical; and
wherein the cage further includes two rim portions axially outward of the plurality of slots, and at least one rim portion includes an axially elastically deformable spring portion extending axially outwardly therefrom.

2. The roller bearing assembly of claim 1, wherein at least one of the rim portions includes a radial projection configured to engage an axial end of the outer race to axially align the cage and the outer race.

3. The roller bearing assembly of claim 1, wherein the cage further includes axial ends, at least one axial end formed with at least one wear bump.

4. The roller bearing assembly of claim 1, wherein the roller bearing assembly is configured to support a camshaft between a first cam lobe and a second adjacent cam lobe, the cage being configured to extend an axial length that substantially fills a space between the first cam lobe and the second cam lobe.

5. A roller bearing assembly comprising:
a plurality of rollers;
a cage including a plurality of slots for positioning the plurality of rollers; and
an outer race positioned radially outside the plurality of rollers and the cage,
wherein the cage includes axial ends formed with integral positioning features, at least one axial end including at least one of axially elastically deformable spring portions extending axially outwardly therefrom and wear bumps adapted to wear away by frictional engagement with an adjacent structure extending axially outwardly therefrom.

6. The roller bearing assembly of claim 5, further comprising means for retaining axial alignment between the cage and the outer race provided integrally with at least one of the cage and the outer race.

7. The roller bearing assembly of claim 5, wherein the cage includes a radially extending projection that engages an end face of the outer race to retain axial alignment between the cage and the outer race.

8. The roller bearing assembly of claim 7, wherein the cage includes a second radially extending projection engaging an opposite end face of the outer race.

9. The roller bearing assembly of claim 5, wherein the outer race is cylindrical and not split at any point along its circumference.

10. The roller bearing assembly of claim 5, wherein the cage includes at least one axial end formed with wear bumps.

* * * * *